(Model.)  
4 Sheets—Sheet 1.
J. E. KIMBALL.
NAILING MACHINE FOR BOOTS OR SHOES.
No. 261,931. Patented Aug. 1, 1882.
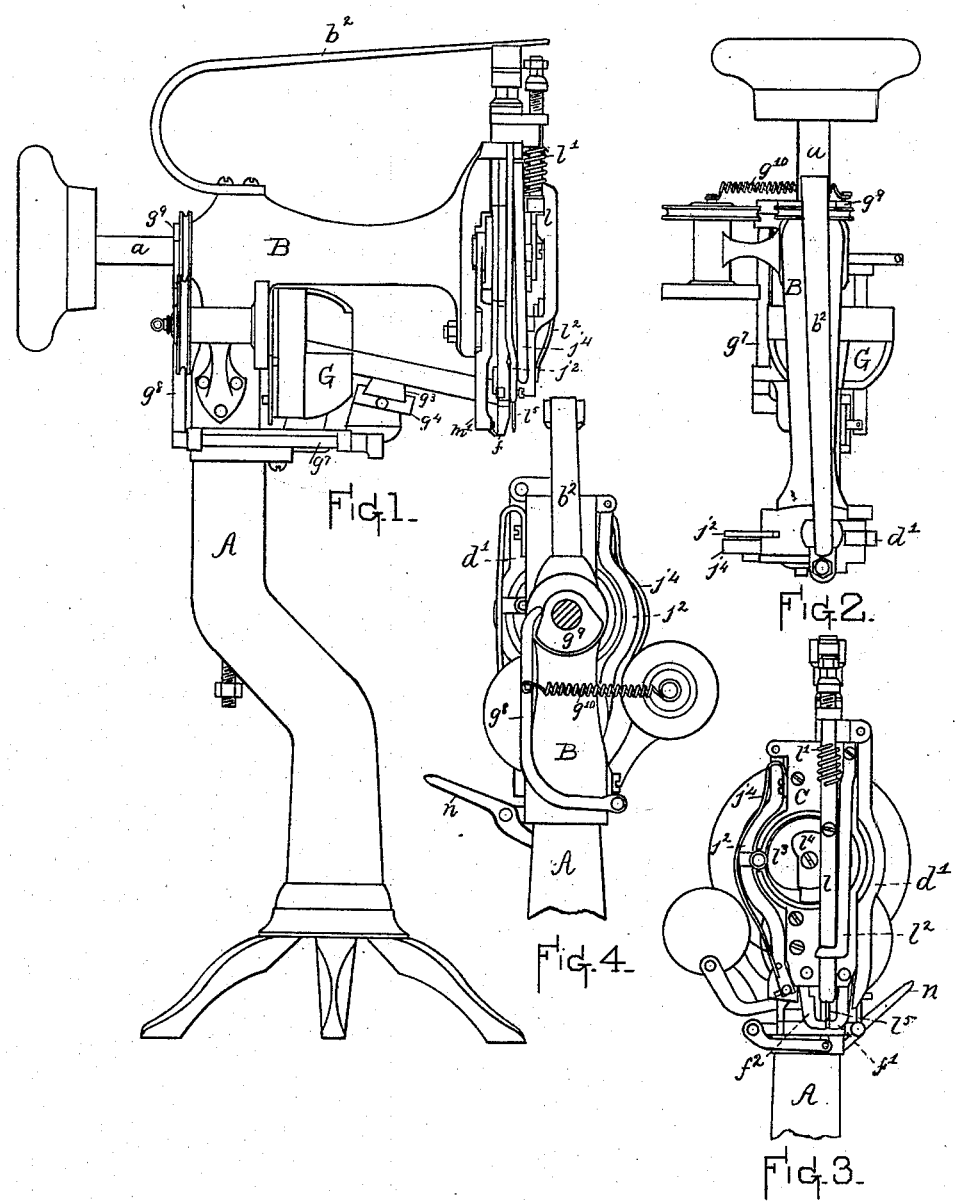
Witnesses:  
Wm Zittel  
John R. Snow
Inventor:  
Joseph E. Kimball

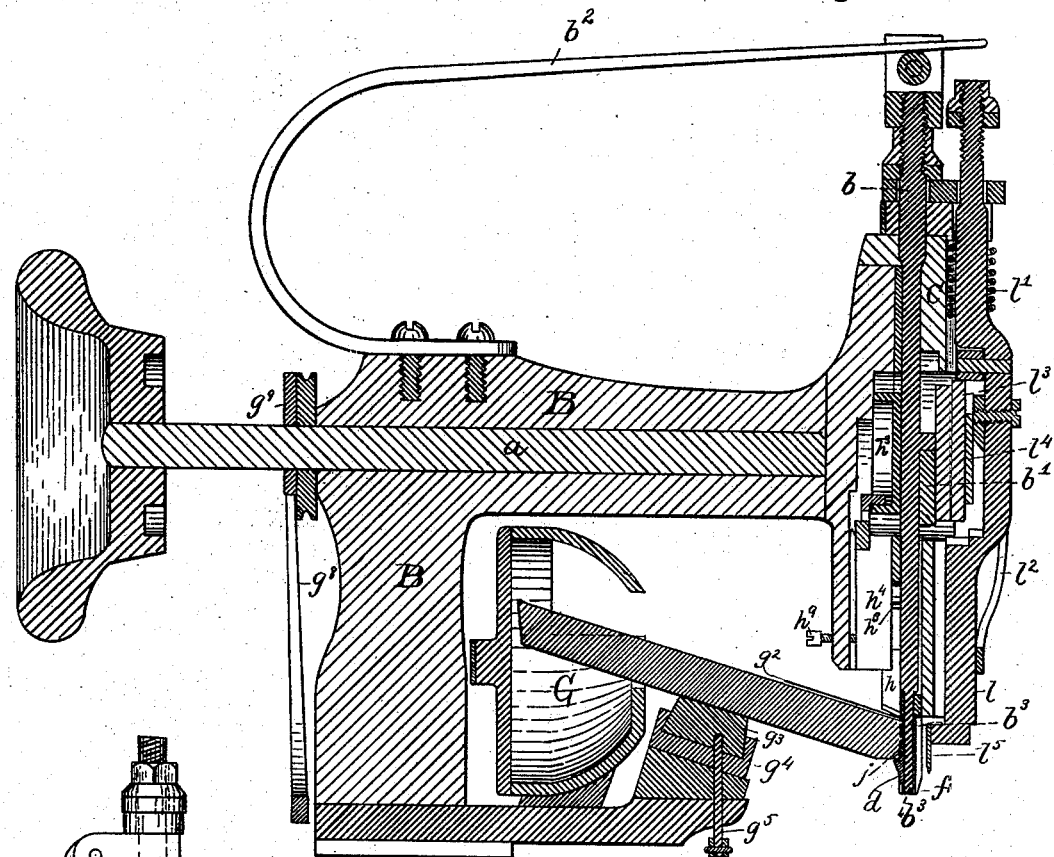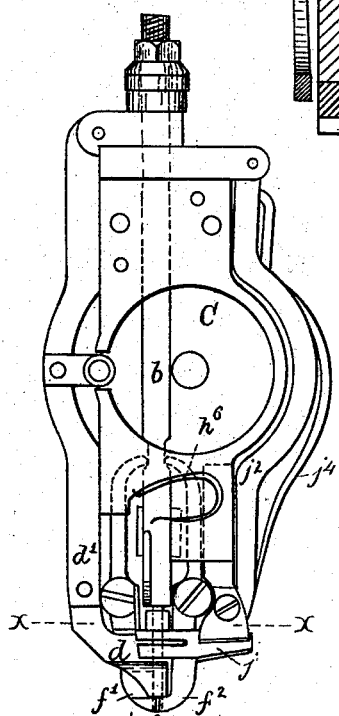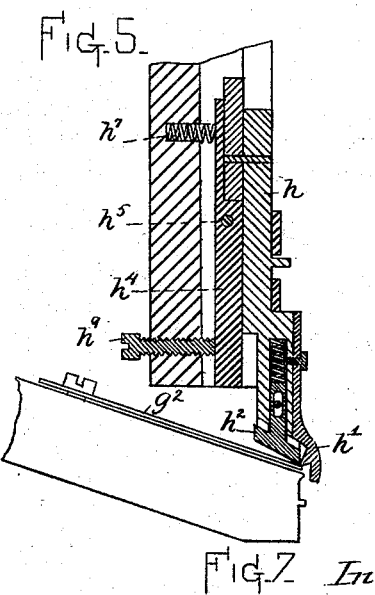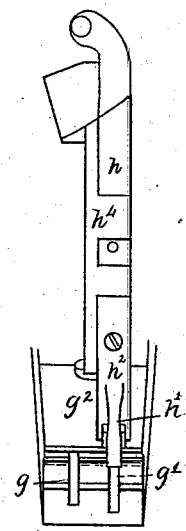

(Model.) 4 Sheets—Sheet 3.
J. E. KIMBALL.
NAILING MACHINE FOR BOOTS OR SHOES.
No. 261,931. Patented Aug. 1, 1882.
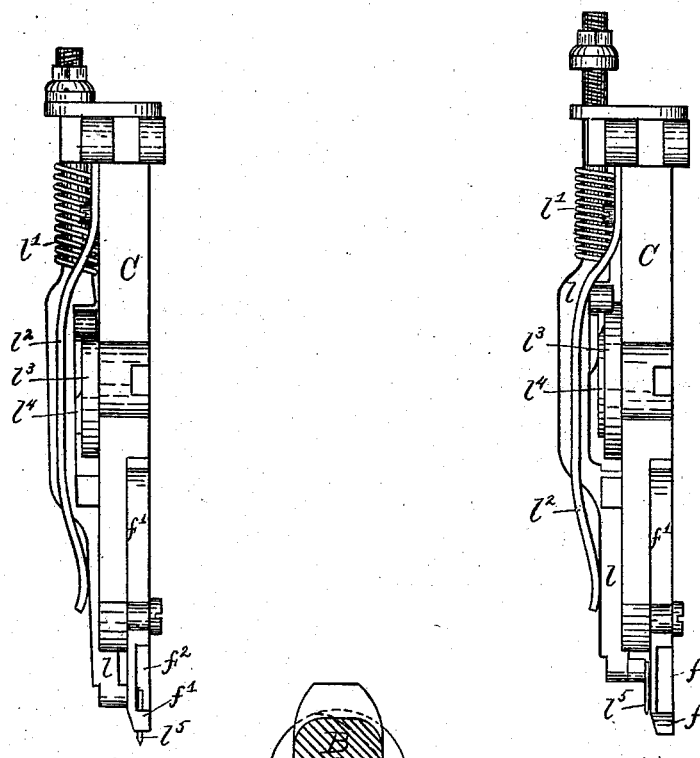
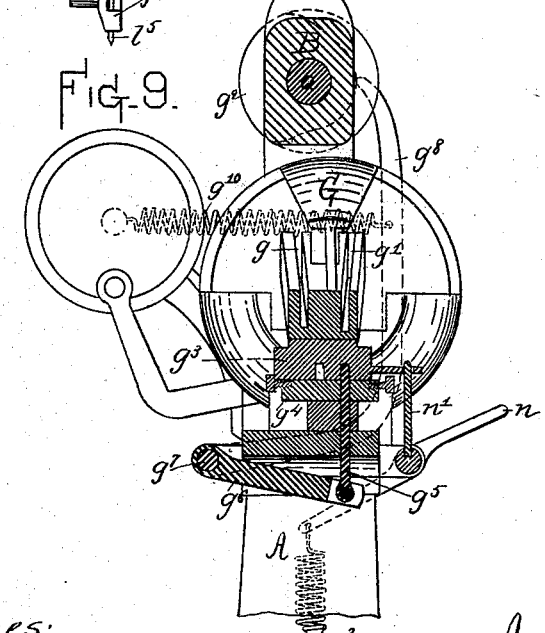

(Model.)

J. E. KIMBALL.

NAILING MACHINE FOR BOOTS OR SHOES.

No. 261,931. Patented Aug. 1, 1882.

Witnesses:

Inventor
Joseph E. Kimball

UNITED STATES PATENT OFFICE.

JOSEPH E. KIMBALL, OF ABINGTON, MASSACHUSETTS.

NAILING-MACHINE FOR BOOTS OR SHOES.

SPECIFICATION forming part of Letters Patent No. 261,931, dated August 1, 1882.

Application filed June 23, 1880. (Model.)

*To all whom it may concern:*

Be it known that I, JOSEPH E. KIMBALL, of Abington, in the county of Plymouth and State of Massachusetts, have invented an Improved Machine for Nailing the Soles to the Uppers of Boots or Shoes, of which the following is a full, clear, concise, and exact description, reference being had to the accompanying drawings, making a part hereof.

Figure 12:
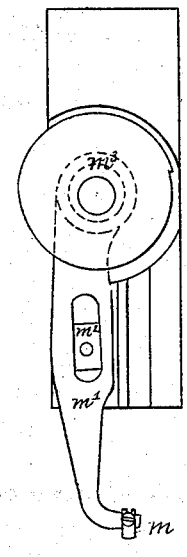
Figure 13:
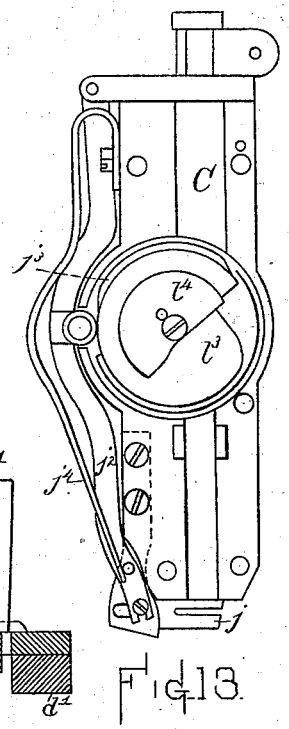
Figure 16:
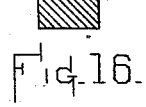
Figure 14:
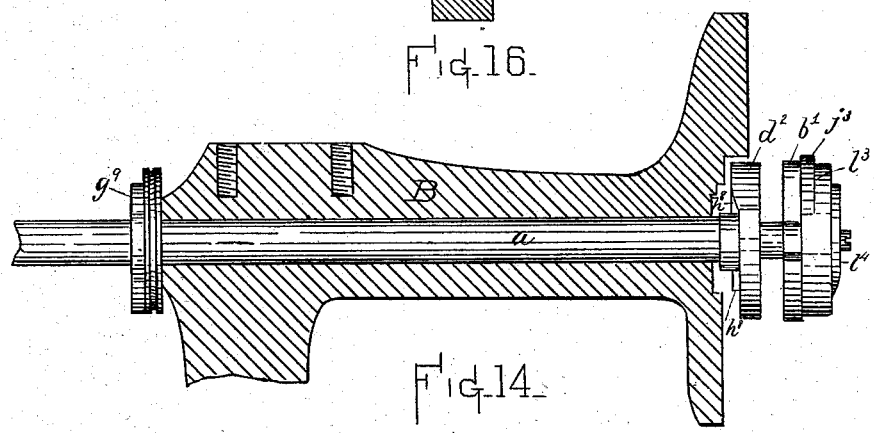
Figure 15:
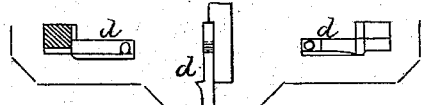

In the drawings, Figure 1 is a side elevation of a machine embodying all parts of my invention in the best forms known to me. Fig. 2 is a plan, Fig. 3 a front view, and Fig. 4 a rear view. Fig 5 is a vertical section, in part on the axis of the driver and throat and in part on the axis of the main shaft, on a larger scale than Figs. 1, 2, 3, and 4. Fig. 6 is a rear view of the face-plate detached, on the same scale as Fig. 5. Figs. 7 and 8 show the end of the guideways and the presser-bar and its adjuncts. Figs. 9 and 10 are side views of the awl-bar and its cams and springs, Fig. 9 showing the awl-bar down and Fig. 10 showing it lifted. Fig. 11 is a view illustrating the locking mechanism of the guideways. Fig. 12 is a front view of the feed-lever and its adjuncts. Fig. 13 is a view of the separator-blade and its adjuncts. Fig. 14 is a side view of the main shaft and its cams. Fig. 15 shows the top, under side, and edge of throat $d$. Fig. 16 is a section on line $x\ x$, Fig. 6.

My invention relates to so many of the features of a succesful machine for nailing soles that its several parts will be best understood after the whole machine is fully described.

In the drawings, A represents the standard, and B the head of the machine. The jack is not shown, as it is too well known to need description.

The machine is used with the well-known pegging-machine jack when employed for nailing soles to uppers; but for some kinds of work the material into which the nails are to be driven may be held otherwise.

The main shaft $a$ is journaled in the head B. The driver-bar $b$ slides in the face-plate C, and is lifted by a cam, $b'$, on the main shaft $a$ and thrown down by a spring, $b^2$. The driver $b^3$ is fast to the bottom of the driver-bar. Just before the driver descends the screw (or the nail if a nail be used—in practice the machine has been used mainly for driving that form of nail commonly called a "clinching-screw") is in the throat $d$, with its lower part between the divided throat $f$, and is therefore directly under the driver. The throat $d$ is attached to the throat-bar $d'$, which is pivoted to the face-plate C, as shown, and is vibrated on its pivot by a cam, $d^2$. When in one position the open side of the throat is at the mouth of one of the guideways, $g\ g'$, and when in the other position, Fig. 6, it is in line with the driver-bar and the divided throat $f$. The divided throat $f$ is formed of two grooves in the jaws of the levers $f'\ f^2$. The upper ends of these levers rest against the driver-bar, and the driver-bar is cut away, as shown, to permit the jaws of levers $f'\ f^2$ to open and allow the head of the screw to pass, for the diameter of the divided throat $f$ is so small as to center the point of the screw and guide it; and this throat must open, therefore, to permit the head of the screw to go through it. The two throats and the driver-bar are best seen in Fig. 6, which is a rear view of the face-plate C detached.

The guideways $g\ g'$ conduct the screws to the throat $d$. These guideways are supplied with screws from the hoppers G, two lengths of screws being frequently required. The means for keeping the guideways supplied with screws ($g$ with one length and $g'$ with a different length) are too well known to need description. The lower ends of the guideways are slightly raised, as shown in the drawings, and covered with a plate of spring metal, $g^2$. The lowermost screw rests against the point $h'$ of the presser-bar $h$ (when the separator-blade $j$ is out of the way) until the presser-bar descends. After the presser-bar descends the point of the lowermost screw is thrown forward into the throat $d$, while the points of those immediately above it are thrown backward by reason of the pressure of the presser $h^2$ on the spring-plate $g^2$ and the shape of the end of the guideways and the pressure of the shoulder of the presser-point $h'$ on the head of the lowermost screw. The blade $j$ passes between the lowermost screw and those above it while it is in this position, with its point thrown out of the guideways and into throat $d$, and when the blade $j$ has thus separated the lowermost screw from the others and closed the mouth of the throat $d$ the lower end of the presser-bar $h$, carrying presser-point $h'$, is thrown out by the cam $h^3$, thus insuring the delivery of the lowermost screw from the guideway into throat $d$. The throat $d$ then moves sidewise, and carries the screw into line with the driver $b^3$ and the divided throat $f$, and the lower part of the screw enters the divided throat $f$. The presser-bar $h$ is mounted in the block $h^4$, which is pivoted to the head B by the pin $h^5$. The presser-bar is lifted by the cam $h^3$ and thrown down by the U-spring $h^6$. Its block $h^4$ has a spring, $h^7$, tending to force its upper end away from the head B, and is moved inward against the force of spring $h^7$ by the cam $h^8$. An adjusting-screw, $h^9$, limits the inward motion of its lower end. These details are best seen in Figs. 7 and 8, which illustrate the construction and operation of the presser in connection with the guideways. When the moving throat $d$ has got into position to receive a screw from one of the guideways the awl-bar $l$ is thrown down by a spring, $l'$, and inward by spring $l^2$, and the awl $l^5$ passes through the divided throat $f$ and punctures the material. The awl-bar $l$ is then lifted by cam $l^3$ and moved outward by cam $l^4$, and remains in that position until its next stroke. This is best seen in Figs. 9 and 10, Fig. 9 being a side view of the awl-bar and its cams and springs, showing the awl protruding from the divided throat, and Fig. 10 being the same with the awl-bar raised.

The feed-foot $m$ is attached to the feed-lever $m'$. This lever is slotted to receive its fulcrum $m^2$ and actuated by the eccentric $m^3$, as will be understood by all skilled in the art without further description. (See Fig. 12.)

The separator-blade $j$ is fast to slide $j'$, and this slide is moved by the lever $j^2$, cam $j^3$, and spring $j^4$, as is clearly shown in Fig. 13, which is a detached view of the separator-blade and the parts which move and hold it.

When the guideways are to be shifted the operator puts his foot upon a treadle (not shown) connected with the lever $n$, the arm $n'$ of which is so connected with the slide $g^3$, upon which the two guideways $g$ $g'$ are fast, that the motion of the lever $n$ will move slide $g^3$, and the guideways with it, the proper distance to bring guideways $g$ into the place previously occupied by the guideways $g'$. The spring $n^2$ throws back the slide $g^3$ when the guideways $g'$ are to be again used to supply throat $d$. The slide $g^3$ is locked in its ways $g^4$ by means of bolt $g^5$, and this bolt is controlled by arm $g^6$ from rock-shaft $g^7$. Arm $g^8$ of rock-shaft $g^7$ is moved in one direction by cam $g^9$ and in the opposite direction by spring $g^{10}$. The slide $g^3$ is thus prevented from moving except during a portion of the revolution of the main shaft. This slide $g^3$ is in practice provided with stops for adjusting accurately the extremes of its motion. Fig. 11 shows in detail this locking device.

Operation: The feed-foot presses against the sole of the shoe and carries it away from the divided throat $f$ just after a screw has been driven, and feeds in the well-known way, leaving the shoe-sole in contact with the divided throat $f$, ready for the awl to puncture it. During this time the driver $b^3$ has risen out of the throats $f$ and $d$ and the throat $d$ has moved sidewise to bring its open mouth in line with that one of the guideways $g$ or $g'$ from which the screws are taken. The awl-bar $l$ is then released by its cam $l^3$ and thrown down and inward by its springs $l'$ $l^2$, making a hole for the next screw, and is immediately moved up and outward by its cams. As soon as throat $d$ gets into line with the proper guideway the presser-bar $h$ is released by its cam $h^3$ and thrown down by its spring $h^6$, the shoulder on $h'$ resting on the top of the head of the outermost screw, and the presser $h^2$ forcing the leaf-spring $g^2$ against the heads of the screws under it, and as soon as the screws in the guideway are thus arranged the blade $j$ is moved forward between the outermost screw and the others above it, closing the mouth of throat $d$, tending to carry the outermost screw out of the guideways into throat $d$, and also closing the mouth of the guideway. The presser-point $h'$ is thrown into throat $d$ by cam $h^9$ acting on the upper end of presser-bar block $h^4$, and also thrown down slightly by spring $h^6$, thus insuring the placing of a screw in the open mouth of throat $d$, from which it falls into the closed part of that throat, point down. The throat $d$ is immediately shifted to its position in line with the driver $b^3$ and divided throat $f$. The driver then descends. So long as the guideways $g'$ are in use the mouth of guideways $g$ is closed by the separator-blade $j$; but when the guideways $g$ and $g'$ are shifted the mouth of the guideways $g'$ is closed by the flat side of the lever $f'$. (See Fig. 16.)

One feature of novelty in my machine is the arrangement of the awl and driver so that the awl shall be brought in contact with the driver and pass through the same throat. This is wholly new with me, so far as I know, and is a valuable improvement, not only in machines for driving loose nails or screws, but in other machines where a driver and awl are used.

Another feature of novelty in my machine consists in mounting the main throat $d$ on a bar, $d'$, and giving it the motion described to carry it out of the way of the awl and to bring it back again in line with the driver.

The presser-bar $h$, carrying the presser-point $h'$ and presser $h^2$, is also new with me. Its office is, first, to stop the lowermost screw or nail, and, secondly, to aid in throwing that screw into the throat.

The locking device of the guideways, controlled by a cam on the shaft so that the guideways are locked except during a certain portion of each revolution of the main shaft, is also an important feature of my invention.

The spring-plate $g^2$, covering the screws near the mouth of the guideways, and held out of contact with the screws until the lowermost screw is to be thrown out, when it is forced against the heads of all but the lowermost screw, thereby throwing the points of all but the lowermost screw away from the throat, is also a novel feature and of a good deal of practical importance.

What I claim as my invention is—

1. In a nailing-machine, the combination of the awl, throat, and driver with mechanism, substantially as described, for actuating the awl to bring its axis in line with the axis of the throat and driver just before the awl passes through the throat, and to move the awl and awl-bar out of the way of the driver after the awl is lifted up out of the throat, all substantially as described.

2. In a nailing-machine, the feed-foot $m$, arranged to feed the material forward and leave it in contact with throat $f$, in combination with awl $l^5$, arranged to pass down sidewise and through throat $f$ as soon as the material is left in contact with it by feed-foot $m$, and to rise out of throat $f$ and move away from that throat, and with driver $b^3$, moving vertically in line with throat $f$, all substantially as described.

3. The throat $d$, open for a part of its length and mounted on a moving throat-bar, $d'$, in combination with mechanism, substantially as described, for moving the throat-bar $d'$, as set forth.

4. In combination, the awl $l^5$, driver $b^3$, moving throat $d$, and throat $f$, with mechanism, substantially as described, for carrying throat $d$ out of the way of the awl and bringing it back into line with the driver and throat $f$.

5. The divided throat $f$, in combination with levers $f'$ $f^2$ and driver-bar $b$, cut away, as described, to permit the upper ends of the levers $f'$ $f^2$ to approach each other, in order that throat $f$ may open.

6. The presser-bar $h$, carrying the presser-point $h'$ and presser $h^2$, substantially as described.

7. In combination, the guideways $g$ $g'$ and locking mechanism substantially such as is described, operating, as described, to lock the guideways during a portion of each revolution of the main shaft.

8. In combination, throat $f$, moving throat $d$, one or more guideways, $g$ $g'$, blade $j$, driver $b^3$, and awl $l^5$, substantially as described.

9. In combination, one or more guideways, $g$ $g'$, the spring-plate $g^2$, presser $h^2$, and blade $j$, whereby the plate $g^2$ is forced toward the guideways just before the blade moves across its mouth, substantially as and for the purpose set forth.

JOSEPH E. KIMBALL.

Witnesses:
J. E. MAYNADIER,
J. R. SNOW.